US010443469B2

(12) United States Patent
Yokoyama et al.

(10) Patent No.: US 10,443,469 B2
(45) Date of Patent: Oct. 15, 2019

(54) EXHAUST GAS PURIFICATION SYSTEM AND SHIP HAVING THE SAME

(71) Applicant: YANMAR CO., LTD., Osaka (JP)

(72) Inventors: Tetsuya Yokoyama, Osaka (JP); Tsuyoshi Inoue, Osaka (JP); Yasuyuki Takahata, Osaka (JP); Shunji Hamaoka, Osaka (JP)

(73) Assignee: YANMAR CO., LTD., Osaka (JP)

( * ) Notice: Subject to any disclaimer, the term of this patent is extended or adjusted under 35 U.S.C. 154(b) by 202 days.

(21) Appl. No.: 15/031,056

(22) PCT Filed: Oct. 22, 2014

(86) PCT No.: PCT/JP2014/078131

§ 371 (c)(1),
(2) Date: Apr. 21, 2016

(87) PCT Pub. No.: WO2015/064452

PCT Pub. Date: May 7, 2015

(65) Prior Publication Data

US 2016/0237870 A1 Aug. 18, 2016

(30) Foreign Application Priority Data

Oct. 28, 2013 (JP) ................................ 2013-223644
Oct. 28, 2013 (JP) ................................ 2013-223645

(51) Int. Cl.
*F01N 3/20* (2006.01)
*B01D 53/94* (2006.01)
(Continued)

(52) U.S. Cl.
CPC ....... *F01N 3/2066* (2013.01); *B01D 53/9418* (2013.01); *B01D 53/9431* (2013.01);
(Continued)

(58) Field of Classification Search
CPC .... F01N 3/2066; F01N 3/2892; F01N 13/087; F01N 2240/20; F01N 2410/00;
(Continued)

(56) References Cited

U.S. PATENT DOCUMENTS 3,972,685 A * 8/1976 Hanaoka .................. F01N 3/20
422/175
4,625,511 A 12/1986 Scheitlin et al.
(Continued)

FOREIGN PATENT DOCUMENTS

DE 102012008539 A1 10/2012
EP 3121401 A1 1/2017
(Continued)

*Primary Examiner* — Audrey K Bradley
*Assistant Examiner* — Kelsey L Stanek
(74) *Attorney, Agent, or Firm* — Norton Rose Fulbright US LLP

(57) ABSTRACT

An exhaust gas purification system includes, as an exhaust gas path of an engine to be mounted in a ship, a main path which is in communication with outside, a bypass path which branches off from a halfway portion of the main path, and a combined casing with which both the main path and the bypass path are in communication. A selective catalyst reduction device is accommodated in the combined casing at a location close to the main path. A path-switching member which switches exhaust gas moving direction is placed in a branched portion between the main path and the bypass path. A reducing agent injection body is placed in the main path between the path-switching member and the combined casing.

20 Claims, 13 Drawing Sheets

(51) Int. Cl.
*F01N 3/28* (2006.01)
*F01N 13/08* (2010.01)

(52) U.S. Cl.
CPC ......... *F01N 3/2892* (2013.01); *F01N 13/087* (2013.01); *B01D 2251/2067* (2013.01); *B01D 2259/124* (2013.01); *B01D 2259/4566* (2013.01); *F01N 2240/20* (2013.01); *F01N 2410/00* (2013.01); *F01N 2590/02* (2013.01); *F01N 2610/02* (2013.01); *F01N 2610/1453* (2013.01); *Y02T 10/24* (2013.01)

(58) Field of Classification Search
CPC ............. F01N 2590/02; F01N 2610/02; F01N 2610/1453; B01D 53/9418; B01D 53/9431; B01D 2251/2067; B01D 2259/124; B01D 2259/4566; Y02T 10/24
USPC ........................................................... 60/301
See application file for complete search history.

(56) References Cited

U.S. PATENT DOCUMENTS 5,082,479 A 1/1992 Miller
2011/0258991 A1* 10/2011 Hwang ................. F01N 3/2053 60/295
2015/0016214 A1* 1/2015 Mueller ................ B01F 5/0616 366/337
2017/0009630 A1 1/2017 Takahata et al.

FOREIGN PATENT DOCUMENTS

JP H06-050126 A 2/1994
JP H06-178906 A 6/1994
JP H07-29013 B2 4/1995
JP 2006-341742 12/2006
JP 2007-198316 A 8/2007
JP 2009-216074 A 9/2009
JP 2010-071149 4/2010
JP 2010071149 A * 4/2010
JP 2010-203266 9/2010
JP 2011-528088 11/2011
JP 2013-015149 A 1/2013
JP 51294 1/2013
JP 2013-155727 8/2013
KR 10-0951440 B1 4/2010
WO 2005/023641 A 3/2005
WO WO 2013112101 A1 * 8/2013 ........... F01N 3/2053

* cited by examiner 1
2
3
4
5
6
7
8
9
10
10
11
13
14
15
16
21
22
23
24
25
26

60
65c
42
66
66
45
33
45
41
52
51
69
62
32
31
56
55
67
68
61
38
37
58
57
53
59

51
52
47
48
33
41
45
44
31
40
43
43
44
32
45
34
43
43
45
35
44
33
40
42
49
60

33
52
62
71
72b
72a
72
73
31
14
55
61
62
71
72b
72a
72
73

EXHAUST GAS PURIFICATION SYSTEM AND SHIP HAVING THE SAME

TECHNICAL FIELD

The present invention relates to an exhaust gas purification system which removes a harmful component in exhaust gas discharged from an engine mounted in a ship, and also relates to a ship having the exhaust gas purification system.

BACKGROUND OF THE INVENTION

In a conventional ship such as a tanker and a transport vessel, an amount of electricity consumed by various auxiliary equipment, a cargo device, illumination, an air conditioner and other devices is huge, and to supply electricity to these electric devices, the ship includes a diesel power generator in which a diesel engine and a power generator for generating electricity by a driving operation the diesel engine are combined (see Patent Document 1 for example). It is known that the diesel engine is one of internal combustion engines having the highest energy efficiency, and an amount of carbon dioxide included in exhaust gas per unit output is small. Further, since the diesel engine can use low quality fuel such as heavy oil, the diesel engine has an advantage that it is economically excellent also.

In exhaust gas of the diesel engine, many nitrogen oxides, sulfur oxides and particulate materials are also included in addition to carbon dioxides. They are mainly produced from heavy oil which is fuel, and they are harmful materials which are obstructive to environment conservation. Especially nitrogen oxide (NOx, hereinafter) is harmful to human bodies, and exhibits strong acid, and it is considered that the nitrogen oxide is the cause of acid rain. Therefore, a machine which drives the diesel power generator such as a ship discharges an extremely large amount of NOx, and it is considered it largely damages the global environment.

As postprocessing means for largely purifying NOx, a selective catalyst reduction method (SCR method, hereinafter) using urea as a reducing agent is generally used. The SCR method uses a NOx catalyst of a honeycomb structure made of a material that oxide carrier such as Ti carries an active component such as V and Cr. If urea water as reducing agent aqueous solution is sprayed on an upstream side of the NOx catalyst, the urea water is hydrolyzed by heat of exhaust gas and ammonia is produced, the ammonia as a reducing agent acts on NOx, and NOx is decomposed into harmless nitrogen and water.

Patent Literature

Patent Document 1: Japanese Unexamined Patent Publication No. 2006-341742

SUMMARY OF INVENTION

If global environment is taken into consideration, it is necessary to remove NOx in exhaust gas as much as possible, and it is preferable to regulate the NOx uniformly in both the high seas and closed sea. However, under present circumstances, as higher exhaust gas regulation concerning the diesel engine is applied, it is scheduled to provide regulation marine area concerning NOx. Since the NOx catalyst is of the honeycomb structure as described above, there is fear that the NOx catalyst becomes clogged with soot or particulates. Performance of the NOx catalyst is deteriorated by a sulfur component in exhaust gas and a product caused by the sulfur. To extend the lifetime of the NOx catalyst as long as possible and to reduce running costs and to reliably comply with the regulation in the regulation marine area, it is considered that the NOx catalyst is not exposed to exhaust gas during sailing along marine area other than regulation marine area.

Hence, the present applicant previously proposed that a purification casing for accommodating NOx catalyst therein was provided in an exhaust gas path, and a bypass path through which exhaust gas bypassed branched off from the exhaust gas path upstream side of the purification casing without passing through the NOx catalyst (see Japanese Patent Application Laid-open No. 2010-71149 for example). In this case, exhaust gas is sent toward the purification casing during sailing in the regulation marine area, and exhaust gas is sent toward the bypass path during sailing in marine area other than the regulation marine area. Hence, it is possible to extend the lifetime of the NOx catalyst, and there are advantages that the running costs are cut down, and the purification performance can be maintained for a long time.

According to the conventional structure, however, since the bypass path bypassing the NOx catalyst is provided separately from the exhaust gas path and the purification casing, there is a problem that a long piping distance of the bypass path is required, and the producing costs are increased. Further, since an installation space of the bypass path is required separately from the purification casing, if an engine room of a ship is narrow, it may be difficult to install the bypass path.

It is an object of the present invention to provide an exhaust gas purification system improved in view of these circumstances and to provide a ship having the exhaust gas purification system.

According to a first aspect of the invention, there is provided an exhaust gas purification system comprising, as exhaust gas paths of an engine to be mounted in a ship, a main path which is in communication with outside and a bypass path which branches off from a halfway portion of the main path, and comprising a combined casing with which both the main path and the bypass path are in communication, wherein a selective catalyst reduction device which accelerates reduction of NOx existing in exhaust gas of the engine is accommodated in the combined casing at a location close to the main path, a path-switching member which switches exhaust gas moving directions between the main path and the bypass path is placed in a branched portion between the main path and the bypass path, and a reducing agent injection body of a reducing agent supply device which supplies reducing agent to exhaust gas is placed in the main path between the path-switching member and the combined casing.

According to a second aspect of the invention, in the exhaust gas purification system of the first aspect, an exhaust gas mixer which mixes exhaust gas and a reducing agent is placed in the main path between the path-switching member and the combined casing at a location downstream of the reducing agent injection body in the exhaust gas moving direction.

According to a third aspect of the invention, in the exhaust gas purification system of the first or second aspect, an interior of the combined casing is partitioned into the main path and the bypass path by a partition plate extending along the exhaust gas moving direction.

According to a fourth aspect of the invention, in the exhaust gas purification system of any one of the first to third aspects, the main path and the bypass path merge with each other in an outlet of the combined casing.

According to a fifth aspect of the invention, there is provided a ship comprising a plurality of engines, wherein the exhaust gas purification system corresponds to each of the engines in a one-to-one relation.

According to a sixth aspect of the invention, there is provided an exhaust gas purification system in which exhaust gas paths of a plurality of engines to be mounted in a ship merge with a single assembly path, the exhaust gas purification system comprises, as the assembly path, a main path which is in communication with outside, and a bypass path which branches off from a halfway portion of the main path, wherein a path-switching member which switches exhaust gas moving directions between the main path and the bypass path is placed in a branched portion between the main path and the bypass path, the exhaust gas purification system further includes a combined casing which configures a portion of the main path and a portion of the bypass path, and a selective catalyst reduction device which accelerates reduction of NOx existing in exhaust gas of the engine is accommodated in the combined casing at a location close to the main path.

According to a seventh aspect of the invention, in the exhaust gas purification system of the sixth aspect, a reducing agent injection body of a reducing agent supply device which supplies a reducing agent to exhaust gas, and an exhaust gas mixer which mixes exhaust gas and a reducing agent are arranged in this order from upstream in the exhaust gas moving direction, in the main path between the path-switching member and the combined casing.

According to an eighth aspect of the invention, in the exhaust gas purification system of the sixth or seventh aspect, an interior of the combined casing is partitioned into the main path and the bypass path by a partition plate which extends along the exhaust gas moving direction, and the main path and the bypass path merge with each other in an outlet of the combined casing.

The first aspect of the invention provides an exhaust gas purification system comprising, as exhaust gas paths of an engine to be mounted in a ship, a main path which is in communication with outside and a bypass path which branches off from a halfway portion of the main path, and comprising a combined casing with which both the main path and the bypass path are in communication, wherein a selective catalyst reduction device which accelerates reduction of NOx existing in exhaust gas of the engine is accommodated in the combined casing at a location close to the main path, a path-switching member which switches exhaust gas moving directions between the main path and the bypass path is placed in a branched portion between the main path and the bypass path, and a reducing agent injection body of a reducing agent supply device which supplies reducing agent to exhaust gas is placed in the main path between the path-switching member and the combined casing. Therefore, as compared with a case where the main path and the bypass path are divided and provided in separate casings, it is easy to form the bypass path, it is possible to efficiently process exhaust gas, to extend the lifetime of the selective catalyst reduction device and to cut down the manufacturing costs.

Further, since the reducing agent injection body of the reducing agent supply device is located outside the combined casing, a length of the main path between the path-switching member and the combined casing can easily be set to such a value that a reducing agent is dispersed and the reducing agent and exhaust gas can appropriately be mixed. Since the reducing agent injection body is located in the main path between the path-switching member and the combined casing, even if a problem such as failure is generated in the path-switching member, there is no fear that urea water is supplied toward the bypass path, and it is possible to eliminate a problem that unused ammonia is discharged outside a ship as it is.

According to the second aspect of the invention, an exhaust gas mixer which mixes exhaust gas and a reducing agent is placed in the main path between the path-switching member and the combined casing at a location downstream of the reducing agent injection body in the exhaust gas moving direction. Therefore, it is possible to mix exhaust gas and the reducing agent by the exhaust gas mixer as uniform as possible, a length of the main path between the path-switching member and the combined casing can be made shorter, and the entire exhaust gas path can be made compact. Further, the combined casing can be reduced in size and the installation space can be made small. Hence, it becomes easy to provide the combined casing in the narrow engine room in the ship for example.

According to the third aspect of the invention, an interior of the combined casing is partitioned into the main path and the bypass path by a partition plate extending along the exhaust gas moving direction. Therefore, it is possible to easily form the two paths in the combined casing with the simple configuration, i.e., only by adding the partition plate. Thus, it is possible to cut down the manufacturing costs of the combined casing which accommodates the selective catalyst reduction device.

According to the fourth aspect of the invention, the main path and the bypass path merge with each other in an outlet of the combined casing. Therefore, both exhaust gas which passes through the main path and is purified and exhaust gas which passes through the bypass path can be sent to a downstream side of the exhaust gas path which is connected to the outlet of the combined casing. Therefore, the exhaust structure can be simplified and the manufacturing costs can be cut down.

In the case of the conventional ship having a plurality of auxiliary engines (e.g., power-generating engines) which are engines, since the ship separately includes the main path and the bypass path, twice number of exhaust gas paths as the engines are required, the bypass path must be assembled in a shipbuilding yard, and the number of operation steps is increased. According to the fifth aspect of the invention, on the other hand, since the main path and the bypass path are handled as one path in the combined casing, it is only necessary to prepare the same number of exhaust gas paths as the engines. Further, the assembling operation of the bypass path in the shipbuilding yard is unnecessary. The number of operation steps can be reduced and the costs can be cut down.

The sixth aspect of the invention provides an exhaust gas purification system in which exhaust gas paths of a plurality of engines to be mounted in a ship merge with a single assembly path, the exhaust gas purification system comprises, as the assembly path, a main path which is in communication with outside, and a bypass path which branches off from a halfway portion of the main path, wherein a path-switching member which switches exhaust gas moving directions between the main path and the bypass path is placed in a branched portion between the main path and the bypass path, the exhaust gas purification system further includes a combined casing which configures a portion of the main path and a portion of the bypass path, and a selective catalyst reduction device which accelerates reduction of NOx existing in exhaust gas of the engine is accommodated in the combined casing at a location close to the main path. In the case of the conventional ship having a plurality of auxiliary engines which are engines, since the ship separately includes the main path and the bypass path, twice number of exhaust gas paths as the engines are required, the bypass path must be assembled in a shipbuilding yard, and the number of operation steps is increased. According to the configuration of the first aspect of the invention, on the other hand, the exhaust gas paths are gathered and then, the main path and the bypass path as the assembly path are handled as one path in the combined casing. Therefore, it is possible to extremely simplify the exhaust structure of the ship having the plurality of engines. The assembling operation of the bypass paths in the shipbuilding yard is unnecessary, the number of operation steps can be reduced and the costs can be cut down. The entire exhaust gas path can be made compact, the combined casing can be reduced in size and the installation space can be made small. Hence, it becomes easy to provide the combined casing in the narrow engine room in the ship for example.

According to the seventh aspect of the invention, a reducing agent injection body of a reducing agent supply device which supplies a reducing agent to exhaust gas, and an exhaust gas mixer which mixes exhaust gas and a reducing agent are arranged in this order from upstream in the exhaust gas moving direction, in the main path between the path-switching member and the combined casing. Therefore, the reducing agent injection body of the reducing agent supply device and the exhaust gas mixer are located outside the combined casing. Hence, a length of the main path between the path-switching member and the combined casing can easily be set to such a value that a reducing agent is dispersed and the reducing agent and exhaust gas can appropriately be mixed. Especially, the reducing agent injection body is located in the main path between the path-switching member and the combined casing. Therefore, even if a problem such as failure is generated in the path-switching member, there is no fear that urea water is supplied toward the bypass path, and it is possible to eliminate a problem that unused ammonia is discharged outside a ship as it is.

According to the eighth aspect of the invention, an interior of the combined casing is partitioned into the main path and the bypass path by a partition plate which extends along the exhaust gas moving direction, and the main path and the bypass path merge with each other in an outlet of the combined casing. Therefore, it is possible to easily form the two paths in the combined casing with the simple configuration, i.e., only by adding the partition plate. Thus, it is possible to cut down the manufacturing costs of the combined casing which accommodates the selective catalyst reduction device. Further, both exhaust gas which passes through the main path and is purified and exhaust gas which passes through the bypass path can be sent to a downstream side of the assembly path which is connected to the outlet of the combined casing. Therefore, the exhaust structure can be simplified and the manufacturing costs can be cut down.

DESCRIPTION OF THE PREFERRED EMBODIMENTS

Embodiments in which the present invention is embodied will be described based on the drawings when the invention is applied to a diesel power generator mounted in a ship.

(1). Summary of Ship

Figure 1:
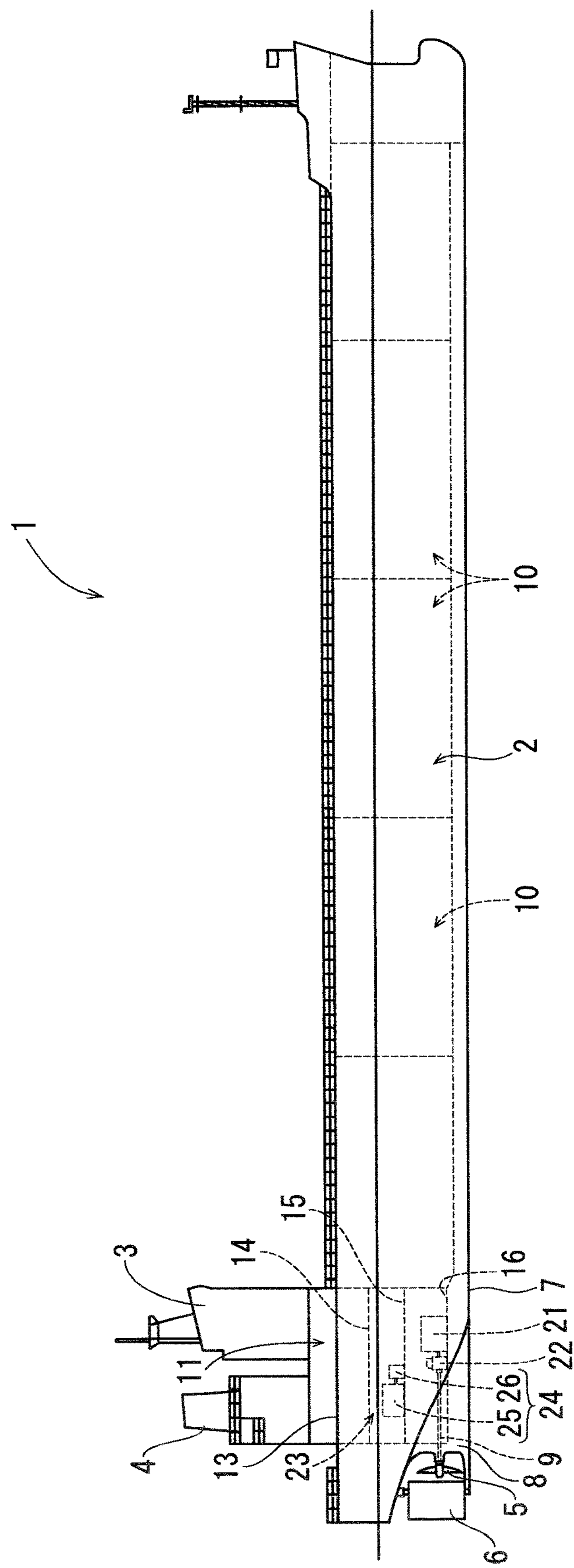
FIG. 1 is a side view of an entire ship.

First, a summary of a ship 1 in a first embodiment will be described with reference to FIG. 1. The ship 1 of the first embodiment includes a ship's hull 2, a cabin 3 (bridge) provided on the side of a stern of the ship's hull 2, a funnel 4 (chimney) placed behind the cabin 3, a propeller 5 provided on a rear lower portion of the ship's hull 2, and a helm 6. In this case, a skeg 8 is integrally formed on a ship's bottom 7 on the side of the stern. A propulsion shaft 9 for rotating and driving the propeller 5 is pivotally supported on the skeg 8. A bow side and a central portion in the ship's hull 2 are provided with ship's holds 10. The stern side in the ship's hull 2 is provided with an engine room 11.

Placed in the engine room 11 are a main engine 21 (diesel engine in first embodiment) which is a driving source of the propeller 5, a speed reducer 22, and a power generating device 23 for supplying electricity to electric systems in the ship's hull 2. The propeller 5 is rotated and driven by a rotation power sent from the main engine 21 through the speed reducer 22. An interior of the engine room 11 is divided into upper and lower sides by an upper deck 13, a second deck 14, a third deck 15 and an inner bottom plate 16. In the first embodiment, the main engine 21 and the speed reducer 22 are mounted on the lowermost inner bottom plate 16 of the engine room 11, and the power generating device 23 is mounted on the intermediate third deck 15 of the engine room 11. Although it is not illustrated in the drawing in detail, each of the ship's holds 10 is divided into a plurality of pieces.

Figure 2:
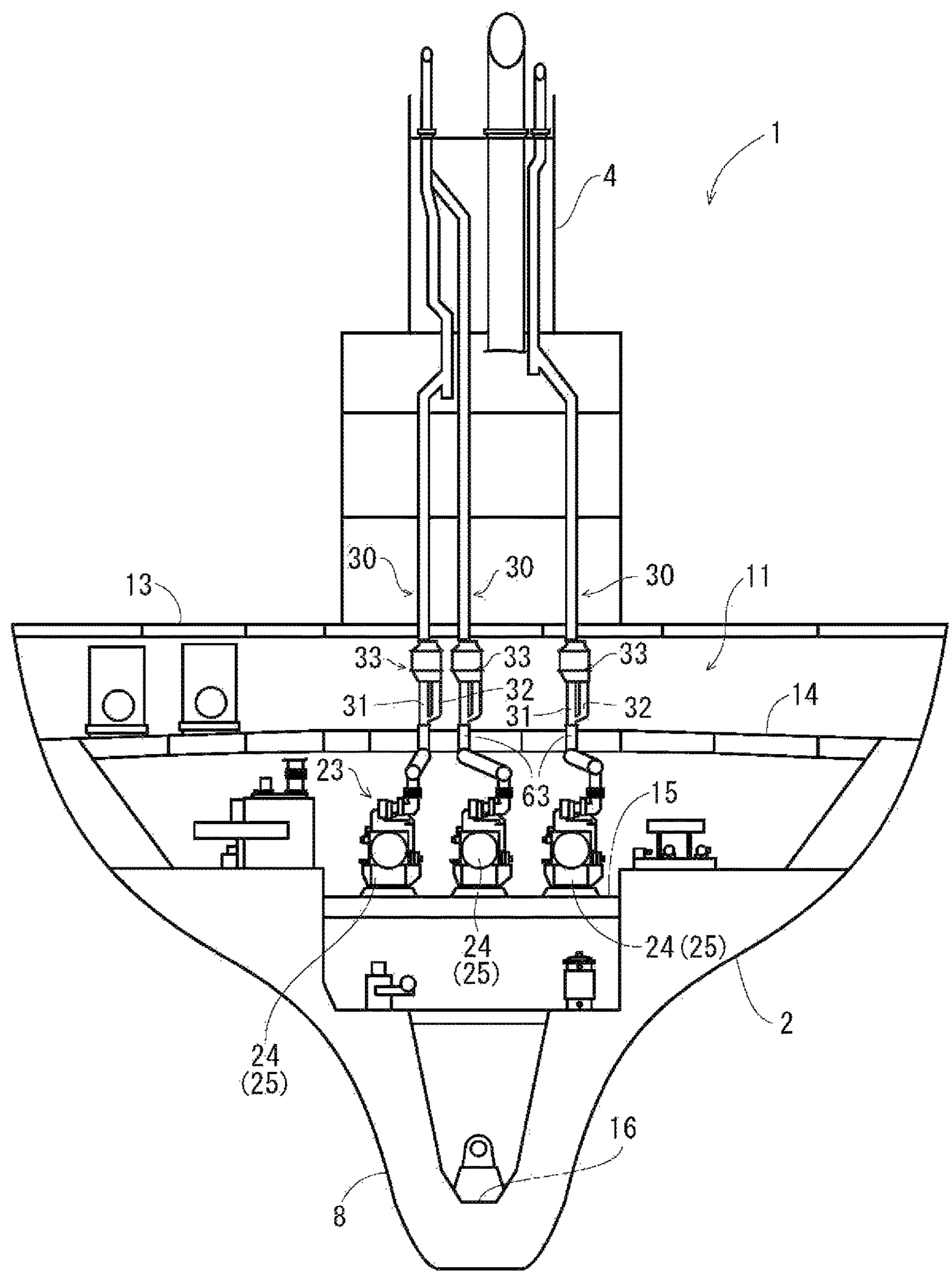
FIG. 2 is a front sectional view taken along line II-II in FIG. 1.

As shown in FIG. 2, the power generating device 23 includes a plurality of (three, in first embodiment) diesel power generators 24. Each of the diesel power generators 24 is composed of a combination of a power-generating engine 25 (diesel engine in first embodiment) and a power generator 26 which generates power by a driving operation of the power-generating engine 25. The diesel power generators 24 are basically configured to efficiently operate in accordance with a required electricity amount in the ship's hull 2. When the ship 1 sails and consumes vast amounts of electricity for example, all of the diesel power generators 24 are operated, and when the ship 1 stops and consumes relatively small electricity, arbitrary one or some of the diesel power generators 24 are operated. Electricity generated by the operation of the power generators 26 is supplied to the electric systems in the ship's hull 2. Although detailed illustration is omitted, an electric power transducer is electrically connected to each of the power generators 26. The electric power transducer detects generated electricity of the power generator 26.

(2). Exhaust System of Power Generating Device

Next, an exhaust system of the power generating device 23 will be described with reference to FIGS. 2 to 6. An intake path (not shown) for air intake and an exhaust gas path 30 for discharging exhaust gas are connected to each of the power-generating engines 25. Air sucked from the intake path is sent to each of cylinders (cylinder in intake stroke) of the power-generating engine 25. When compression stroke of each of the cylinders is completed, fuel sucked from a fuel tank is sent, under pressure, into a combustion chamber of the cylinder by a fuel injection device, and expansion stroke associated with self-ignition combustion of air-fuel mixture is carried out by the combustion chamber.

The exhaust gas path 30 of the power-generating engine 25 extends to the funnel 4 and is in direct communication with outside. Since the number of the power-generating engines 25 is three as described above, three exhaust gas paths 30 exist. Each of the exhaust gas paths 30 of the power-generating engine 25 includes a main path 31 extending to the funnel 4, a bypass path 32 branched off from a halfway portion of the main path 31, and a combined casing 33 which is in communication with both the main path 31 and the bypass path 32. That is, in the first embodiment, the plurality of power-generating engines 25 are provided, and the exhaust gas purification systems each composed of the main path 31, the bypass path 32 and the combined casing 33 respectively correspond to the power-generating engines 25 in a one-to-one relation.

The combined casing 33 is made of heat-resistant metal material and is formed into a substantially cylindrical shape (square tube shape in first embodiment), and the combined casing 33 is placed higher than the third deck 15 on which the power-generating engine 25 is placed. In this case, the combined casing 33 is located on an upper portion of the engine room 11 (on second deck 14 on upper stage of engine room 11). A NOx catalyst 34 and a slip processing catalyst 35 (details thereof will be described later) as selective catalyst reduction devices which accelerate reduction of NOx in exhaust gas of the power-generating engine 25 are accommodated in the combined casing 33 on the side of the main path 31. The bypass path 32 is a path through which exhaust gas bypasses without passing through the NOx catalyst 34 and the slip processing catalyst 35. The main path 31 and the bypass path 32 merge with each other in an exhaust gas outlet 42 of the combined casing 33 (downstream of slip processing catalyst 35 in exhaust gas moving direction (simply downstream, hereinafter)). The selective catalyst reduction device may only be composed of the NOx catalyst 34 without the slip processing catalyst 35.

A branched portion between the main path 31 and the bypass path 32 located outside the combined casing 33 is provided with a gas-operating type main-side switching valve 37 and a gas-operating type bypass-side switching valve 38 as path-switching members which switch the exhaust gas moving direction between the main path 31 and the bypass path 32. The main-side switching valve 37 is provided on the side of an inlet of the main path 31 into the combined casing 33. The bypass-side switching valve 38 is provided on the side of an inlet of the bypass path 32 into the combined casing 33.

The switching valves 37 and 38 are provided for selecting paths through which exhaust gas passes, and they are configured into such a relation that if one of them is opened by compressed gas (air) from a gas supply source (not shown), the other one is closed. In a state where the main-side switching valve 37 is opened and the bypass-side switching valve 38 is closed, exhaust gas in the exhaust gas path 30 passes through the NOx catalyst 34 and the slip processing catalyst 35 located on the side of the main path 31 in the combined casing 33 and is subjected to purification processing and then, the exhaust gas is discharged out from the ship 1. In a state where the bypass-side switching valve 38 is opened and the main-side switching valve 37 is closed, exhaust gas in the exhaust gas path 30 bypasses the NOx catalyst 34 and the slip processing catalyst 35, and is discharged from the ship 1 without being subjected to the purification processing.

(3). Structure of Combined Casing

Next, a structure of the combined casing 33 will be described with reference to FIGS. 3 to 10. As described above, the combined casing 33 is in communication with both the main path 31 and the bypass path 32. The NOx catalyst 34 which accelerates reduction of NOx in exhaust gas, and the slip processing catalyst 35 which accelerates oxidation of an excessively supplied reducing agent (urea water (urea aqueous solution), more specifically ammonia after hydrolysis) are accommodated in series in the combined casing 33 on the side of the main path 31 in the this order from an upstream side in the exhaust gas moving direction (simply upstream, hereinafter). Each of the catalysts 34 and 35 has a honeycomb structure composed of a large number of cells partitioned by porous partition walls (which can be filtered), and includes catalyst metal such as alumina, zirconia, vanadia/titania and zeolite.

The NOx catalyst 34 selectively reduces NOx in exhaust gas using, as a reducing agent, ammonia generated by hydrolysis of urea water from a later-described urea water injection nozzle 61, thereby purifying exhaust gas sent toward the main path 31 in the combined casing 33. The slip processing catalyst 35 oxidizes unreacted (excessive) ammonia which flows out from the NOx catalyst 34, and brings the ammonia into harmless nitrogen. In this case, the reaction shown in the following formulae are occurred on the side of the main path 31 in the combined casing 33:

$$(NH_2)_2CO+H_2O\rightarrow 2NH_3+CO_2 \text{ (hydrolysis)}$$

$$NO+NO_2+2NH_3\rightarrow 2N_2+3H_2O \text{ (reaction at NOx catalyst 34)}$$

$$4NH+3O_2\rightarrow 2N_2+6H_2O \text{ (reaction at slip processing catalyst 35)}$$

Figure 6:
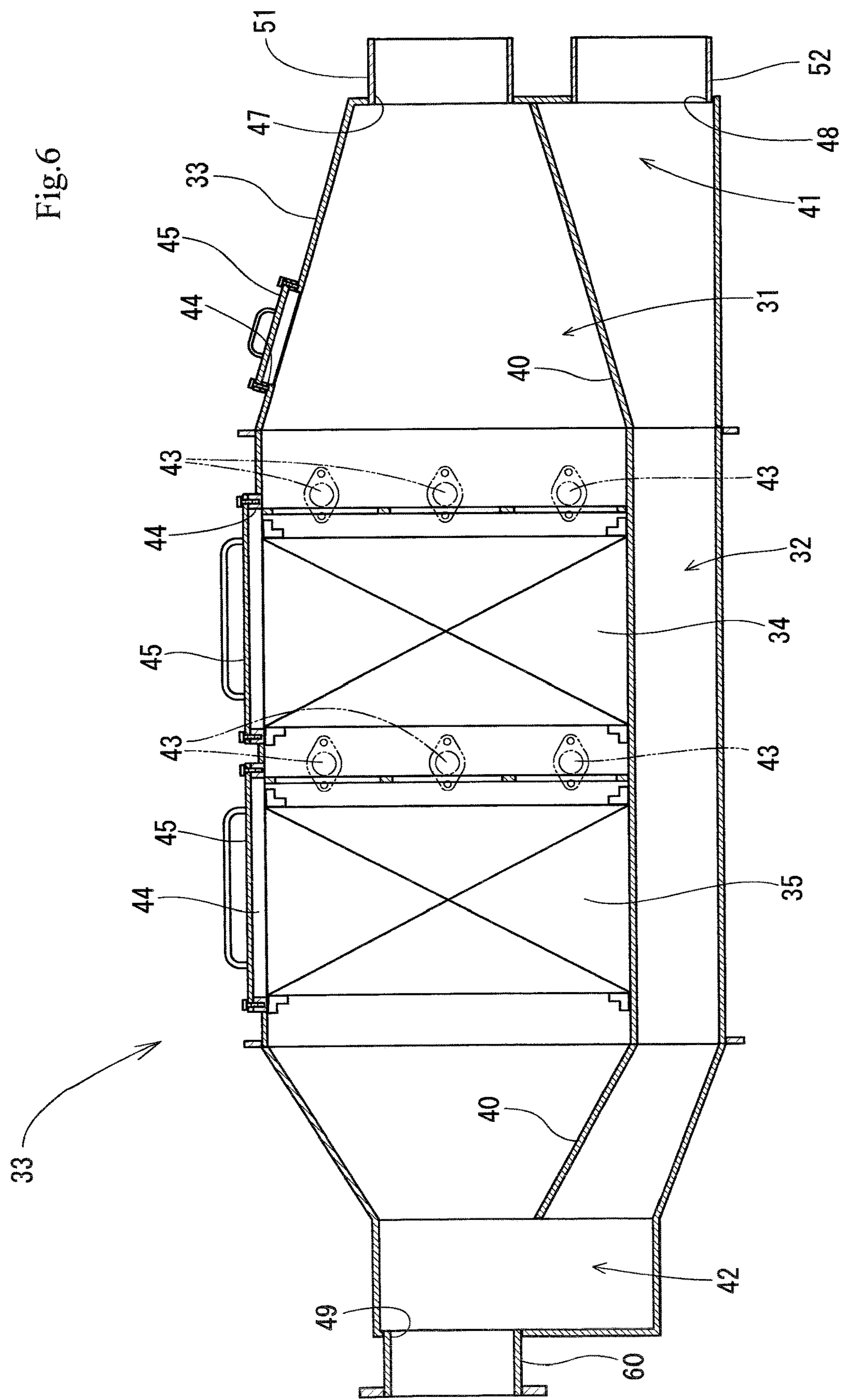
FIG. 6 is a side sectional view of the combined casing.
Figure 7:
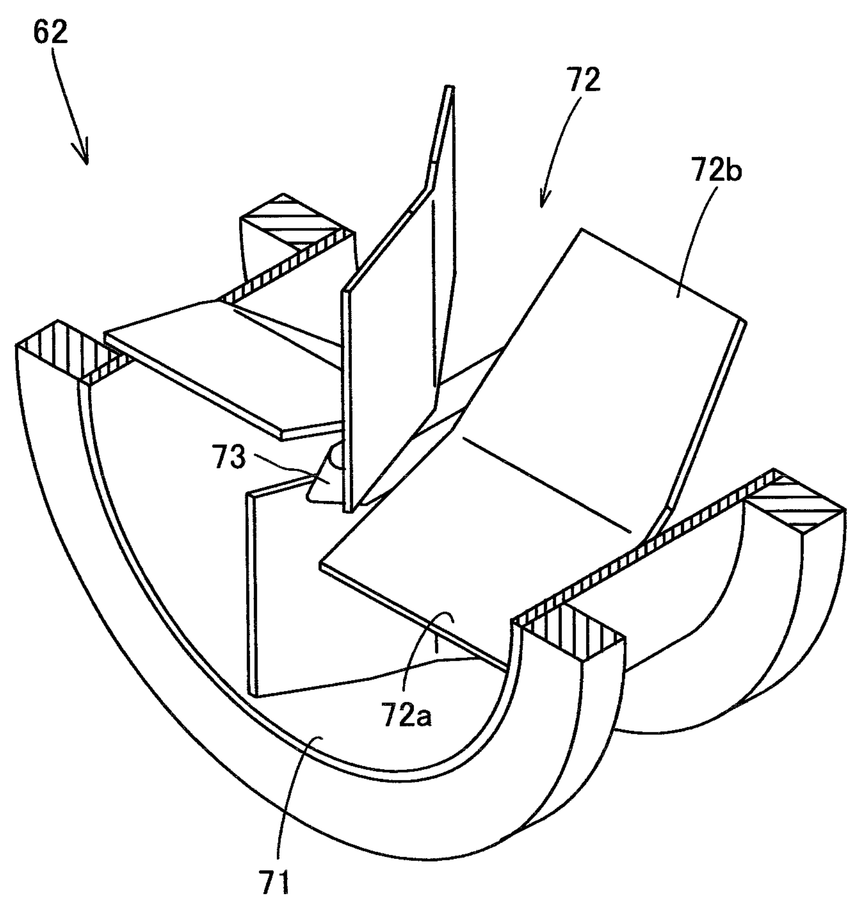
FIG. 7 is a perspective sectional view showing an interior structure of an exhaust gas mixer.
Figure 8:
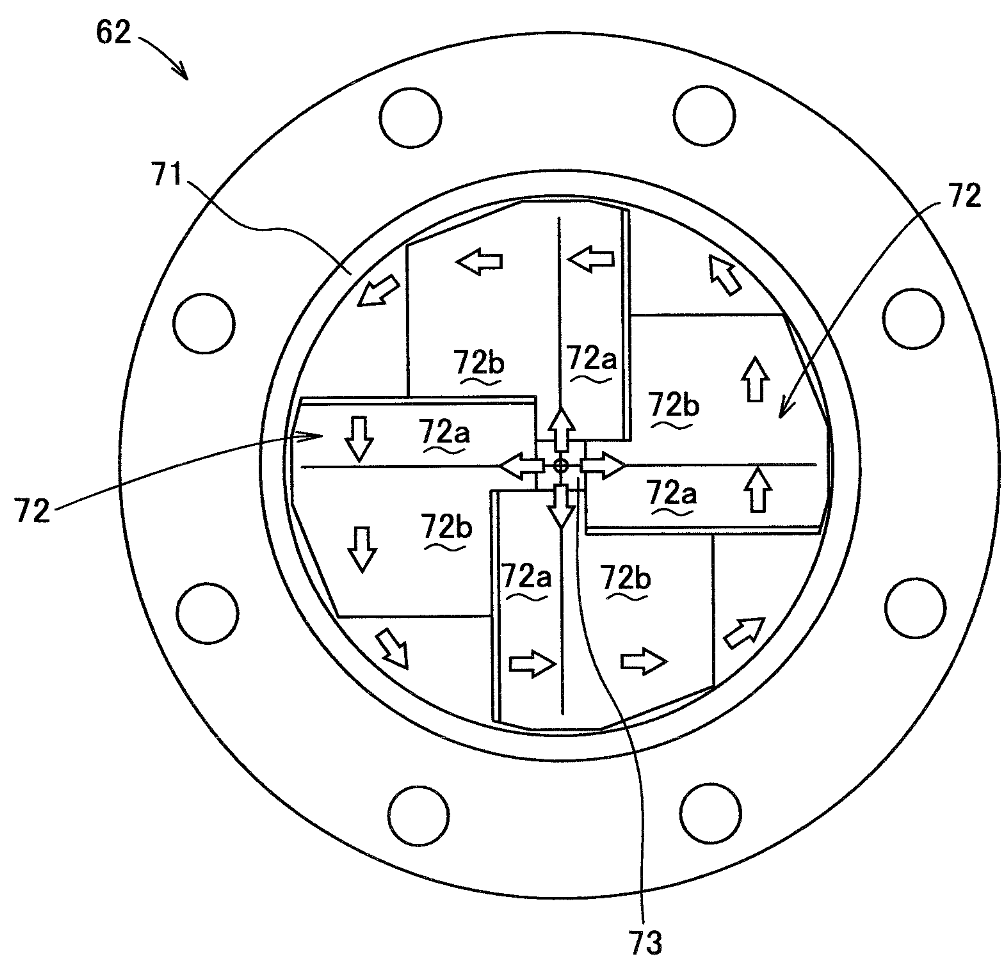
FIG. 8 is a front view of the exhaust gas mixer as viewed from an upstream side of an exhaust gas moving direction.
Figure 9:
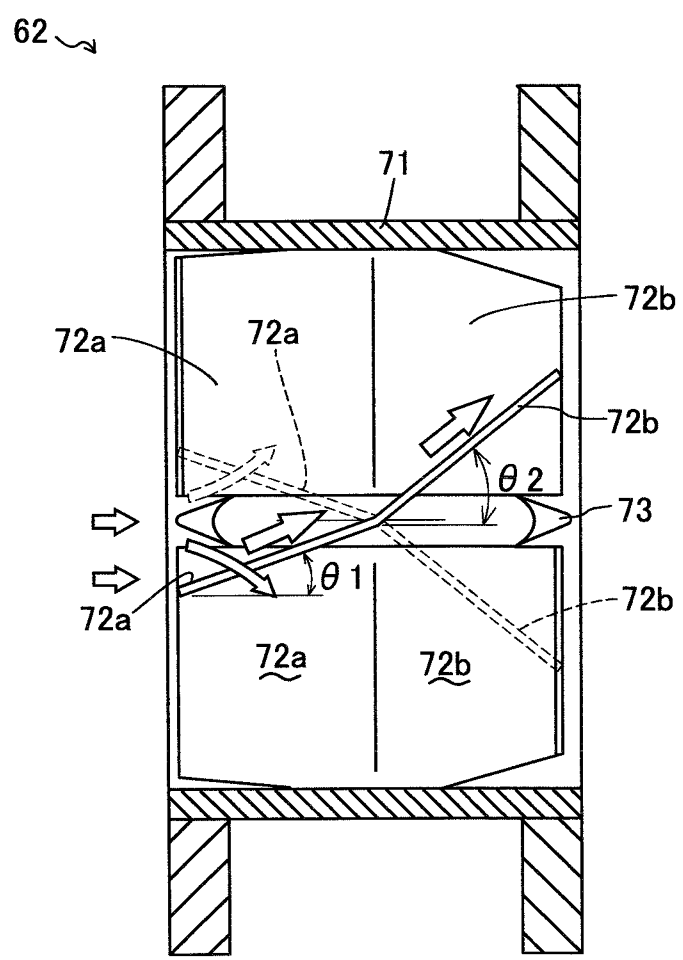
FIG. 9 is a side sectional view of the exhaust gas mixer.
Figure 10:
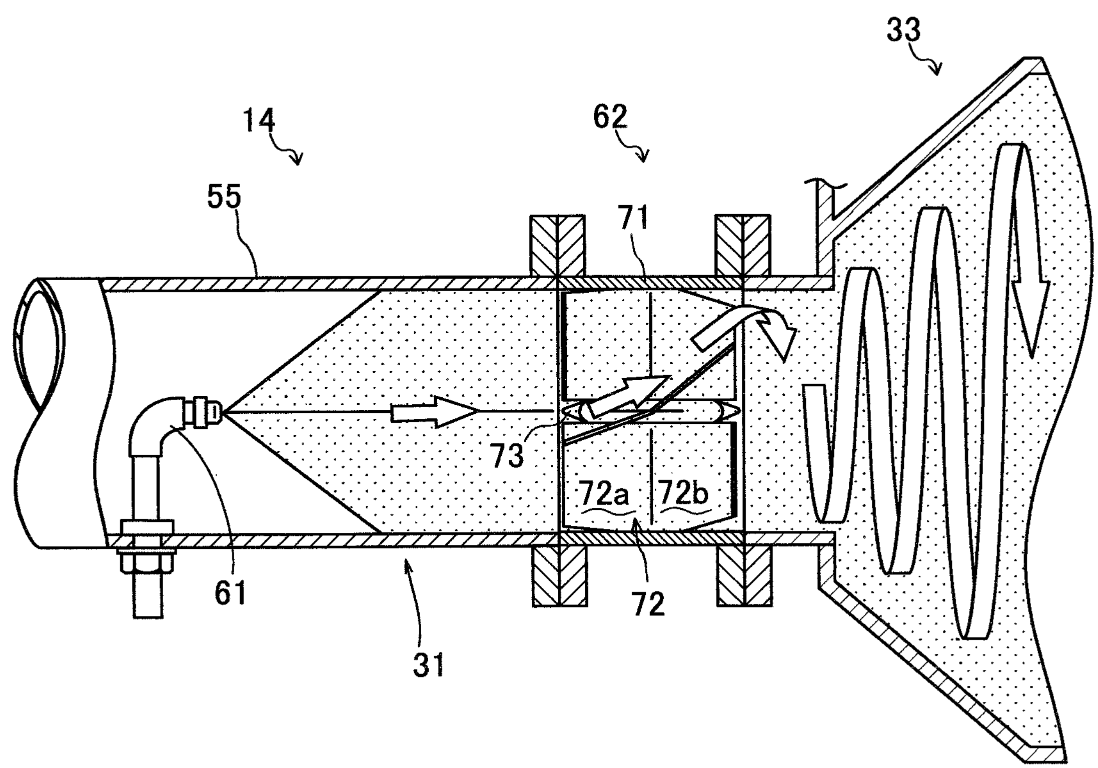
FIG. 10 is a side sectional view for explaining an exhaust gas flow from the exhaust gas mixer toward the exhaust gas mixer.

As shown in FIG. 6 in detail, both the main path 31 and the bypass path 32 are arranged in the combined casing 33. In this case, a partition plate 40 extending along the exhaust gas moving direction is placed in the combined casing 33. The interior of the combined casing 33 is partitioned into the main path 31 and the bypass path 32 by the existence of the partition plate 40. By partitioning the interior of the combined casing 33 by the partition plate 40, it is possible to warm the NOx catalyst 34 and the slip processing catalyst 35 located on the side of the main path 31 using heat of exhaust gas when the exhaust gas passes through the bypass path 32.

Hence, it is possible to always warm up the NOx catalyst 34 and the slip processing catalyst 35 and to easily maintain an activated state irrespective of whether exhaust gas should be purified. Since the warming-up operation is unnecessary when exhaust gas passes through the main path 31, it is possible to purify exhaust gas swiftly.

An upstream end of the partition plate 40 is butted against a front inner surface of an exhaust gas inlet 41 located upstream of a NOx catalyst 62 on the side of the main path 31 in the combined casing 33. The exhaust gas inlet 41 on the side of the main path 31 in the combined casing 33 is tapered (conical shape) toward its tip end such that a cross-sectional area of the exhaust gas inlet 41 is reduced toward the upstream side. On the other hand, a downstream end of the partition plate 40 is terminated in the exhaust gas outlet 42 located downstream of the slip processing catalyst 35 of the combined casing 33. Hence, the main path 31 and the bypass path 32 merge with each other in the exhaust gas outlet 42 of the combined casing 33.

A plurality of injection nozzles 43 as injection bodies are mounted on one side surface of the combined casing 33 at a location upstream of the NOx catalyst 34 and at a location upstream of the slip processing catalyst 35. In the first embodiment, three injection nozzles 43 are provided on one side surface of the combined casing 33 at the location upstream of the NOx catalyst 34, and three injection nozzles 43 are also provided on one side surface of the combined casing 33 at the location upstream of the slip processing catalyst 35. Compressed gas (air) from the gas supply source (not shown) is sprayed by the injection nozzles 43 toward the NOx catalyst 34 and the slip processing catalyst 35. It is possible to forcibly remove soot and dust accumulated in the main path 31 in the combined casing 33 during usage by the operation of the injection nozzles 43.

A plurality of (three in first embodiment) inspection opening windows 44 are formed in the other side surface of the combined casing 33. The inspection opening windows 44 are formed for inspection and maintenance of an interior of the combined casing 33, the injection nozzles 43, the NOx catalyst 34 and the slip processing catalyst 35. The inspection opening windows 44 are usually closed with lid covers 45 such that the windows 44 can open and close. The lid covers 45 are detachably fastened to peripheral edges of the corresponding inspection opening windows 44 with bolts.

A main-side inflow port 47 and a bypass-side inflow port 48 are formed in a front surface of the exhaust gas inlet 41 of each of the combined casings 33. The main-side inflow port 47 is in communication with the main path 31 in the combined casing 33, and the bypass-side inflow port 48 is in communication with the bypass path 32 in the combined casing 33. A front outer surface of the exhaust gas inlet 41 of the combined casing 33 is provided with a main-side introduction pipe 51 which is in communication with the main-side inflow port 47, and a bypass-side introduction pipe 52 which is in communication with the bypass-side inflow port 48. The main-side introduction pipe 51 and the bypass-side introduction pipe 52 are connected to a bifurcated piping 53 through relay pipes 55 and 56, respectively. In this case, an inlet side of the main-side relay pipe 55 is fastened to a main-side outlet 57 of the bifurcated piping 53 through a flange. The other end of the main-side relay pipe 55 is in communication with the main-side introduction pipe 51. An inlet side of the bypass-side relay pipe 56 is fastened to a bypass-side outlet 58 of the bifurcated piping 53 through a flange. The bypass-side introduction pipe 52 is fastened to an outlet of the bypass-side relay pipe 56 through an adjustment pipe 69. The adjustment pipe 69 has a bellows structure for adjusting a length. Extensions of the introduction pipes 51 and 52 and the relay pipes 55 and 56 caused by thermal expansion are absorbed by existence of the adjustment pipe 69. It is only necessary to provide the adjustment pipe 69 on one of the main side and the bypass side. This is because both the main side and the bypass side are connected to the bifurcated piping 53.

Although detailed illustration is omitted, an inlet 59 of the bifurcated piping 53 is connected to an upstream side of the main path 31 through a flange. The bifurcated piping 53 corresponds to a branched portion between the main path 31 and the bypass path 32. The main-side switching valve 37 is provided in the main-side outlet 57 of the bifurcated piping 53 which is in communication with the main path 31 in the combined casing 33. The bypass-side switching valve 38 is provided in the bypass-side outlet 58 of the bifurcated piping 53 which is in communication with the bypass path 32 in the combined casing 33. A main-side valve driving device 67 which switches and drives the main-side switching valve 37 is provided on an outer periphery of the main-side outlet 57 of the main-side relay pipe 55 and the bifurcated piping 53. A bypass-side valve driving device 68 which switches and drives the bypass-side switching valve 38 is provided on an outer periphery of the bypass-side outlet 58 of the bypass-side relay pipe 56 and the bifurcated piping 53. Both the valve driving devices 67 and 68 are arranged in parallel like both the relay pipes 55 and 56. An outflow port 49 is formed in a rear surface of the exhaust gas outlet 42 of the combined casing 33 at a location close to the main path 31. An exhaust gas discharge pipe 60 which is in communication with the outflow port 49 is provided on a rear outer surface of the exhaust gas outlet 42 of the combined casing 33. The exhaust gas discharge pipe 60 is connected to a downstream side of the main path 31 through a flange.

The urea water injection nozzle 61 and an exhaust gas mixer 62 are placed in the main path 31 between the main-side switching valve 37 and the main-side introduction pipe 51 connected to the combined casing 33. The urea water injection nozzle 61 and the exhaust gas mixer 62 are arranged in this order from upstream. The urea water injection nozzle 61 is provided as a reducing agent injection body of a reducing agent supply device which supplies urea water as a reducing agent to exhaust gas. The exhaust gas mixer 62 mixes exhaust gas and the urea water. The reducing agent supply device includes a urea water tank (not shown) in which urea water is stored, a feed pump (not shown) for pumping up urea water from a urea water tank, and the urea water injection nozzle 61 provided on the main-side relay pipe 55. By driving the feed pump, urea water is sent from the urea water tank to the urea water injection nozzle 61, and the urea water is misty sprayed from the urea water injection nozzle 61 into the main-side relay pipe 55.

A nozzle inspection window 63 for inspection and maintenance of the urea water injection nozzle 61 is provided in the main-side relay pipe 55 in the vicinity of the urea water injection nozzle 61. Like the inspection opening windows 44, the nozzle inspection window 63 is also usually closed with a lid cover 64 such that the nozzle inspection window 63 can be opened and closed. The lid cover 64 is detachably fastened to a peripheral edge of the nozzle inspection window 63 with a bolt.

The exhaust gas mixer 62 is provided between the main-side relay pipe 55 and the main-side introduction pipe 51. The exhaust gas mixer 62 is located downstream of the urea water injection nozzle 61 provided on the main-side relay pipe 55, and is separated from the urea water injection nozzle 61 by a predetermined distance. When urea water is injected from the urea water injection nozzle 61, this predetermined distance is a distance required for hydrolyzing the urea water to ammonia in the main-side relay pipe 55. As shown in FIGS. 7 to 10, the exhaust gas mixer 62 of the first embodiment includes a cylindrical mixer pipe body 71 having the same inner diameter as those of the main-side relay pipe 55 and the main-side introduction pipe 51, a plurality of (four in first embodiment) mixing fins 72 provided on an inner periphery of the mixer pipe body 71, and a shaft body 73 located at an axis of the mixer pipe body 71. Swirling flow of exhaust gas and misty urea water which pass through the exhaust gas mixer 62 is generated by the mixing fins 72 and the shaft body 73.

The mixing fins 72 are members for bringing flow of exhaust gas into swirling flow, and the mixing fins 72 are radially placed on the inner periphery of the mixer pipe body 71 around the shaft body 73. In this case, a side end surface of a radially inner side of each of the mixing fins 72 is fixed to the shaft body 73, and a side end surface of a radially outer side of the mixing fin 72 is fixed to an inner peripheral surface of the mixer pipe body 71. The mixing fins 72 are located along a circumferential direction of the mixing pipe body 71 equiangularly from one another (located point-symmetrically around shaft body 73). The number of the mixing fins 72 is not limited to four of the first embodiment.

An upstream side and a downstream side of the mixing fin 72 form a predetermined angle with respect to the exhaust gas moving direction (axial direction of mixer pipe body 71). That is, the mixing fins 72 bend at intermediate portions in the exhaust gas moving direction. In this case, the mixing fins 72 bend such that an angle of an upstream fin plate 72*a* with respect to the exhaust gas moving direction is an inclination angle θ1 and an angle of a downstream fin plate 72*b* with respect to the exhaust gas moving direction is an inclination angle θ2. The inclination angle θ2 of the downstream fin plate 72*b* is set larger than the inclination angle θ1 of the upstream fin plate 72*a*. That is, inclination angles θ1 and θ2 of the fin plates 72*a* and 72*b* are larger at upstream than the angles at downstream. In other words, the inclination angles θ1 and θ2 of the fin plates 72*a* and 72*b* become continuously or gradually larger from the upstream side to the downstream side.

An upstream tip end of the shaft body 73 which supports a side end surface of a radially inner side of the mixing fin 72 is tapered (conical shape) toward its tip end such that its cross-sectional area is reduced toward the upstream side. A downstream base end of the shaft body 73 is reversely tapered (conical shape) toward its rear end such that its cross-sectional area is reduced toward the downstream side. Exhaust gas which flows toward the axis of the mixer pipe body 71 is guided toward the radially outer side mixing fins 72 by the tapered upstream tip end of the shaft body 73.

Figure 4:
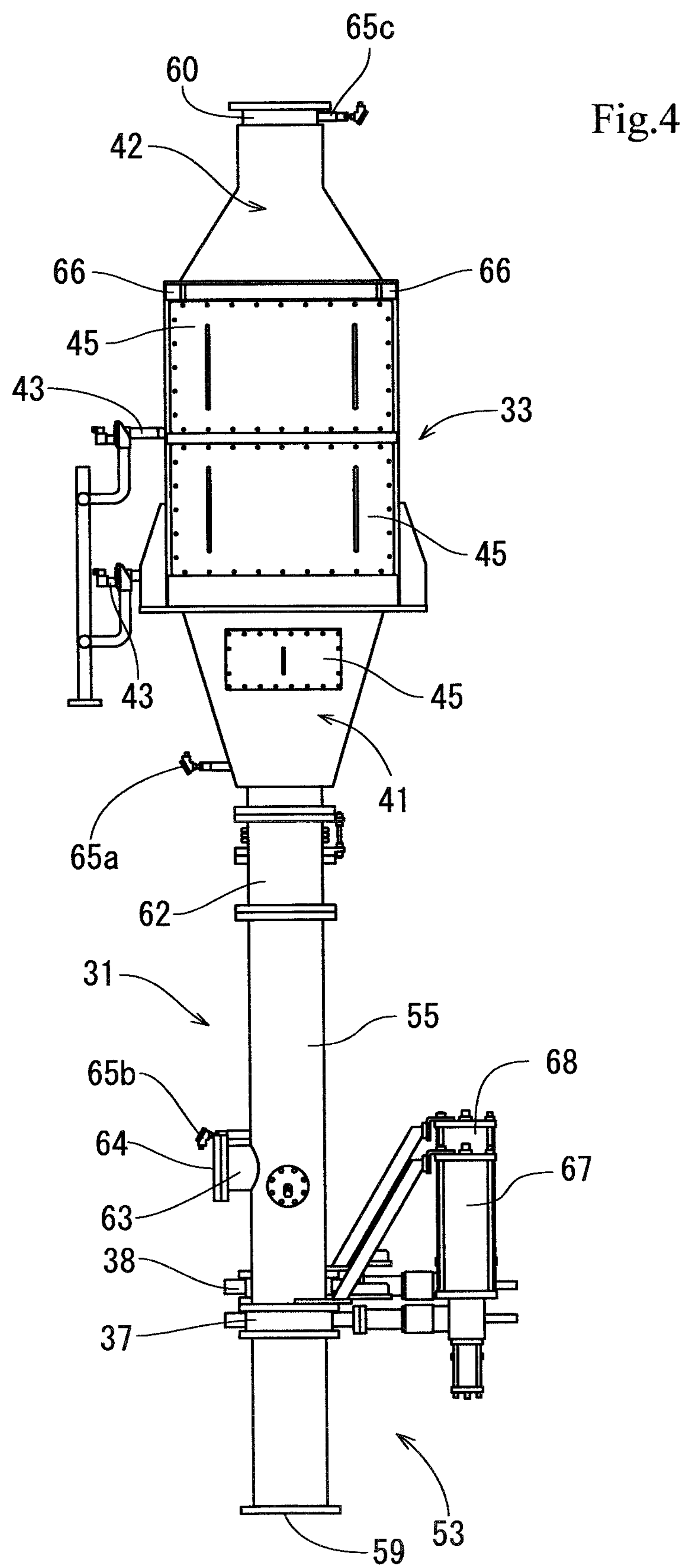
FIG. 4 is a side view of the combined casing.
Figure 5:
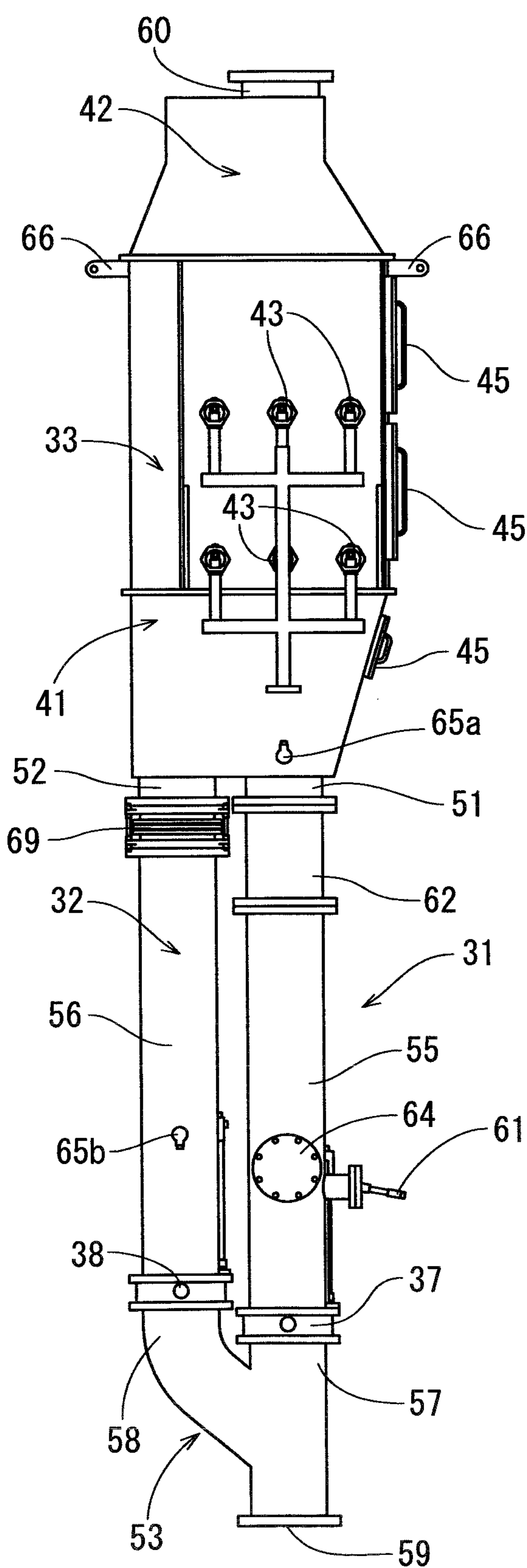
FIG. 5 is a back view of the combined casing.

As shown in FIGS. 4 and 5, a main-side inlet temperature sensor 65*a* which detects temperature of exhaust gas flowing toward the main path 31 in the combined casing 33 is placed on the exhaust gas inlet 41 on the side of the main path 31 of the combined casing 33. A bypass-side inlet temperature sensor 65*b* which detects temperature of exhaust gas flowing toward the bypass path 32 in the combined casing 33 is placed on the bypass-side relay pipe 56. An outlet temperature sensor 65*c* which detects temperature of exhaust gas passing through the main path 31 or the bypass path 32 is placed on the exhaust gas discharge pipe 60 of the combined casing 33.

Figure 3:
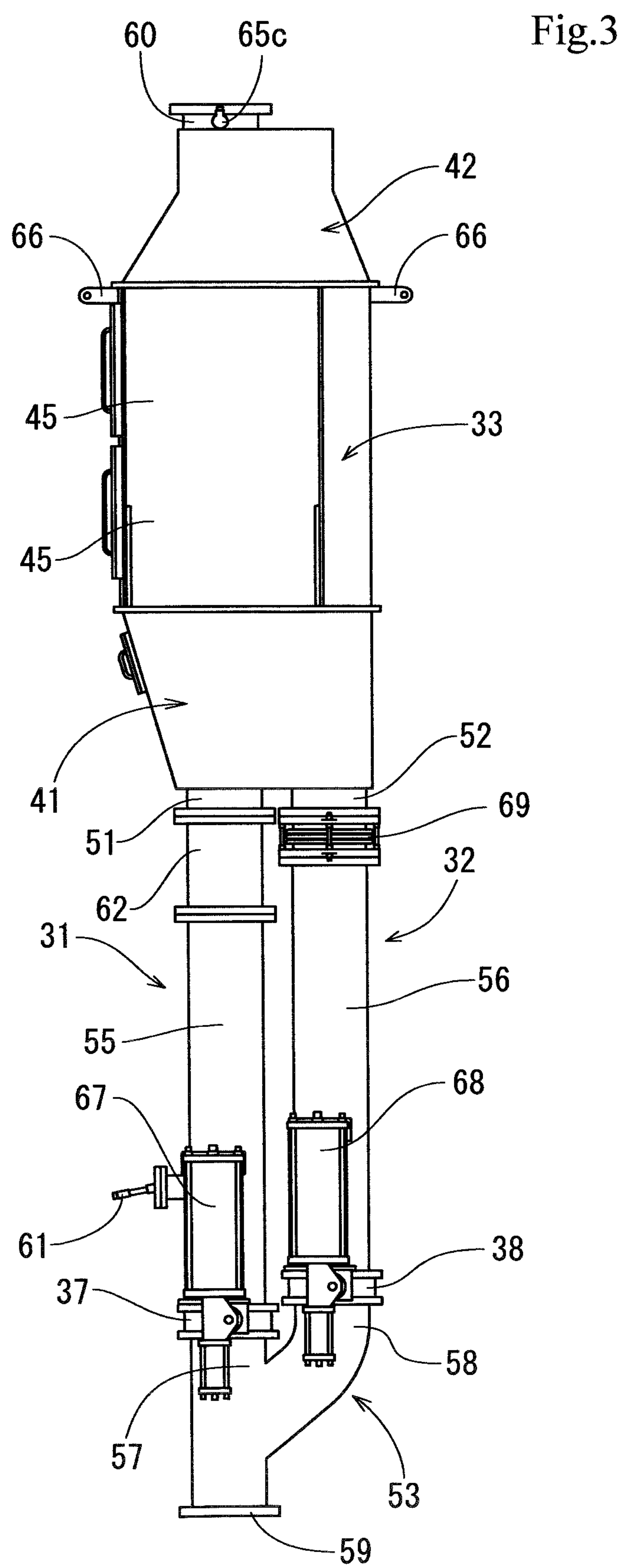
FIG. 3 is a front view of a combined casing.

As shown in FIGS. 3 to 5, a plurality of hoisting clasps 66 are integrally provided on an outer periphery of upper portions of the combined casing 33. In this case, the hoisting clasps 66 are mounted two each (total four) on the upper portions of the two parallel side surfaces of the square tube-shaped combined casing 33. In an assembling factory of the ship 1, the hoisting clasps 66 are locked to a hook (not shown) of a chain block, the combined casing 33 is moved up and down by the chain block, and the combined casing 33 can easily be assembled on the side of an upper portion of the engine room 11 (on second deck 14 of upper stage of engine room 11).

In the above-described configuration, when the main-side switching valve 37 is opened and the bypass-side switching valve 38 is closed, exhaust gas always passes through the main path 31. That is, exhaust gas flows toward the main path 31 in the combined casing 33 through the main-side outlet 57, the main-side relay pipe 55, the exhaust gas mixer 62, the main-side introduction pipe 51 and the main-side inflow port 47 of the bifurcated piping 53, and the exhaust gas passes through the NOx catalyst 34 and the slip processing catalyst 35 and is subjected to the purification processing.

In this case, exhaust gas including misty urea water injected from the urea water injection nozzle 61 is guided into the exhaust gas mixer 62 through the main-side relay pipe 55. The upstream fin plates 72*a* of the mixing fins 72 change the exhaust gas moving direction into the inclination angle θ1 and then, the downstream fin plates 72*b* further change the exhaust gas moving direction into the inclination angle θ2. As a result, the exhaust gas including the urea water flows toward the inner peripheral surface of the mixer pipe body 71, and the exhaust gas moves in the circumferential direction along the inner peripheral surface of the mixer pipe body 71. Hence, a swirling flow of exhaust gas is formed in the exhaust gas inlet 41 on the side of the main path 31 in the combined casing 33, and the exhaust gas and urea water are smoothly and efficiently mixed. The exhaust gas inlet 41 on the side of the main path 31 in the combined casing 33 is tapered (conical shape) toward its tip end such that its cross-sectional area is gradually reduced toward the upstream side. Therefore, a swirling diameter of the swirling flow of the exhaust gas becomes large. As a result, the exhaust gas is further evenly mixed with urea water and is delivered to the NOx catalyst 34 located on the side of the main path 31 in the combined casing 33.

In the first embodiment, the inclination angles θ1 and θ2 of the upstream fin plate 72*a* and the downstream fin plate 72*b* of the mixing fins 72 are made different from each other, and the inclination angle θ2 of the downstream fin plate 72*b* is set larger than the inclination angle θ1 of the upstream fin plate 72*a*. Therefore, it is easy to form a large swirling flow while suppressing the flowing resistance applied to exhaust gas by the mixing fins. Exhaust gas which flows to a location in the vicinity of the axis of the mixer pipe body 71 is guided toward the radially outer side mixing fins 72 by the tapered upstream tip end of the shaft body 73 as described above. Therefore, this point can also enhance the mixing efficiency between exhaust gas and urea water.

Exhaust gas after it is subjected to the purification processing flows toward the downstream side of the exhaust gas path 30 from the outflow port 49 of the exhaust gas outlet 42 of the combined casing 33 through the exhaust gas discharge pipe 60, and is discharged out of the combined casing 33 and of the ship 1.

When the bypass-side switching valve 38 is opened and the main-side switching valve 37 is closed on the other hand, exhaust gas moves from the main path 31 to the bypass path 32. That is, the exhaust gas flows into the combined casing 33 through the bypass-side outlet 58, the bypass-side relay pipe 56, the bypass-side introduction pipe 52 and the bypass-side inflow port 48 of the bifurcated piping 53, the exhaust gas bypasses the NOx catalyst 34 and the slip processing catalyst 35 without being subjected to the purification processing, and passes through the bypass path 32. The exhaust gas after passing through the bypass path 32 flows from the outflow port 49 of the exhaust gas outlet 42 of the combined casing 33 toward the downstream side of the exhaust gas path 30 through the exhaust gas discharge pipe 60, and is discharged out of the combined casing 33 and of the ship 1.

Therefore, when the purification processing of the exhaust gas is necessary (during sailing in regulation marine area for example), and when the purification processing of the exhaust gas is unnecessary (during sailing in marine area other than regulation marine area for example), it is possible to easily select the paths through which exhaust gas passes by the switching operations of both the switching valves 37 and 38. Therefore, it is possible to efficiently process exhaust gas in accordance with whether the purification processing is necessary or unnecessary.

Figure 11:
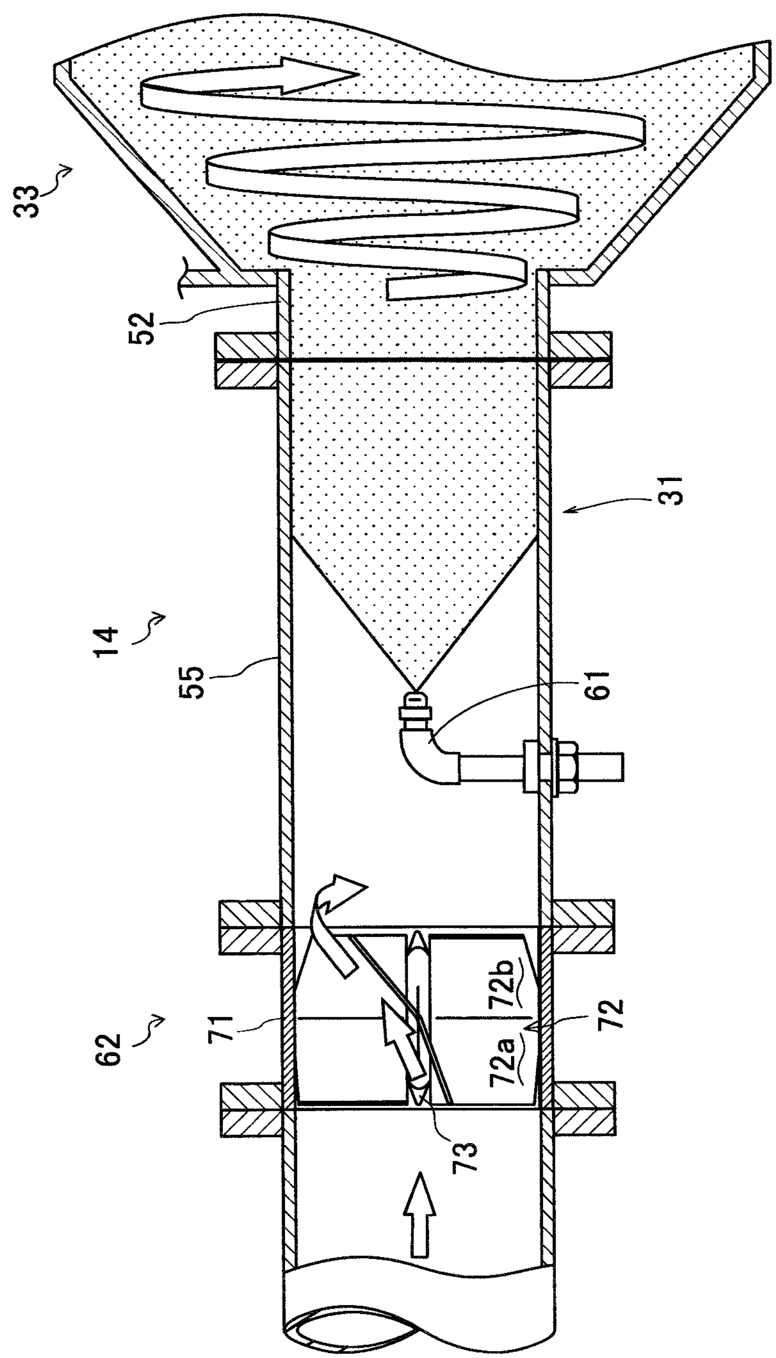
FIG. 11 is a side sectional view showing a first another example of a placement aspect of the exhaust gas mixer.
Figure 12:
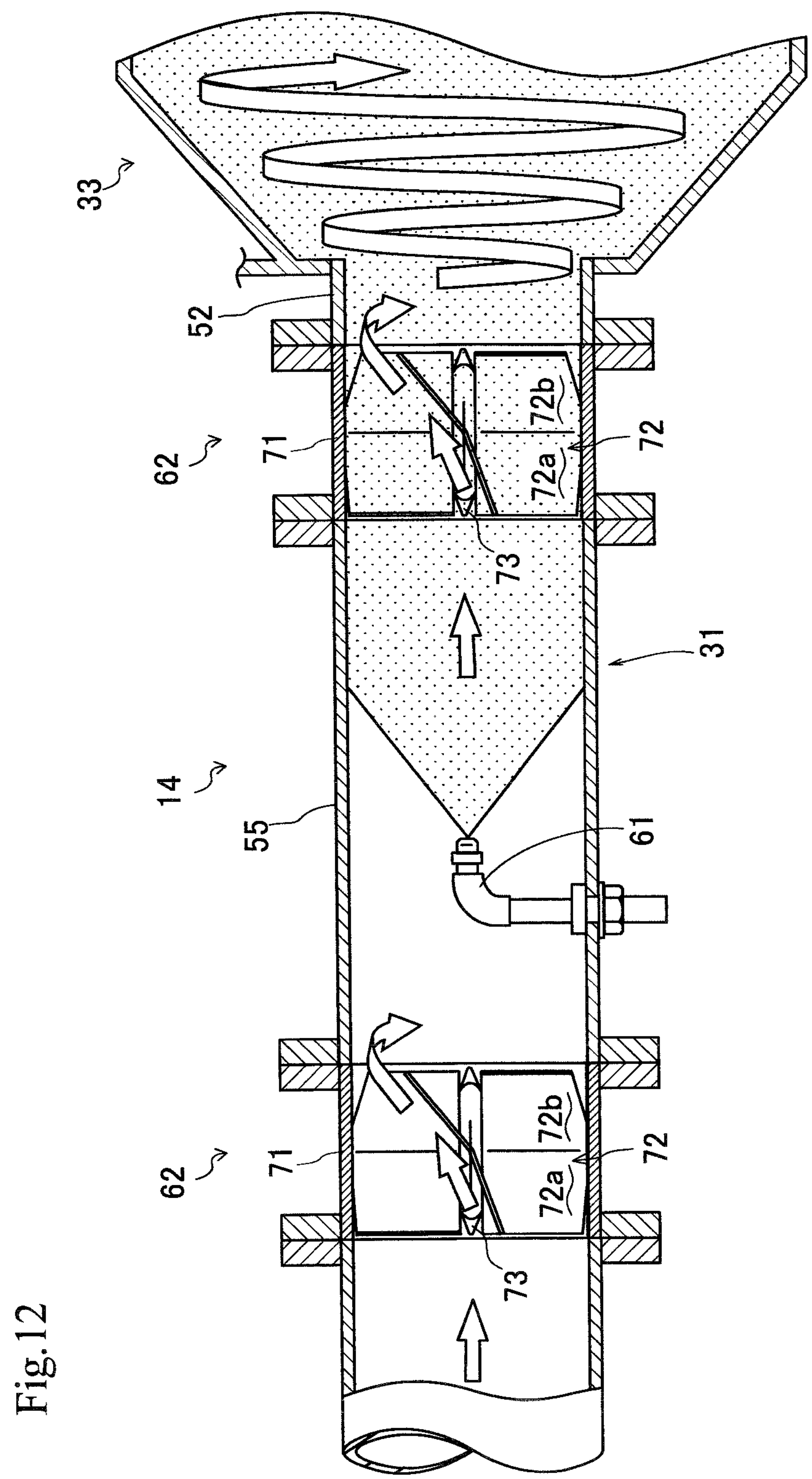
FIG. 12 is a side sectional view showing a second another example of the placement aspect of the exhaust gas mixer.

Although the exhaust gas mixer 62 of this embodiment is separated downstream from the urea water injection nozzle 61 of the main-side relay pipe 55 by the predetermined distance, the exhaust gas mixer 62 is not limited to this positional relation. For example, the exhaust gas mixer 62 may be placed upstream of the urea water injection nozzle 61 and a flow of exhaust gas may previously be brought into a swirling flow before urea water is injected as shown in FIG. 11. It is also possible to place the exhaust gas mixers 62 both upstream and downstream of the urea water injection nozzle 61 as shown in FIG. 12. Structures of the exhaust gas mixers 62 on the upstream side and the downstream side may be common or may be different from each other. With this configuration, it is easier to form a swirling flow, and it is possible to further uniform the mixed state between exhaust gas and misty urea water.

(4). Operation and Effect of First Embodiment

With the above-described configuration, the exhaust gas purification system includes, as exhaust gas paths 30 of an engine 25 to be mounted in a ship 1, a main path 31 which is in communication with outside and a bypass path 32 which branches off from a halfway portion of the main path 31, and includes a combined casing 33 with which both the main path 31 and the bypass path 32 are in communication, wherein a selective catalyst reduction device 34, 35 which accelerates reduction of NOx existing in exhaust gas of the engine 25 is accommodated in the combined casing 33 at a location close to the main path 31, a path-switching member 37, 38 which switches exhaust gas moving directions between the main path 31 and the bypass path 32 is placed in a branched portion 53 between the main path 31 and the bypass path 32, and a reducing agent injection body 61 of a reducing agent supply device which supplies reducing agent to exhaust gas is placed in the main path 31 between the path-switching member 37 and the combined casing 33. Therefore, as compared with a case where the main path 31 and the bypass path 32 are provided in separate casings, it is easy to form the bypass path 32, it is possible to process exhaust gas efficiently, and to extend the lifetime of the selective catalyst reduction device 34, 35, and to cut down manufacturing costs.

Further, the reducing agent injection body 61 of the reducing agent supply device and the exhaust gas mixer 62 are located outside the combined casing 33. Therefore, a length of the main path 31 between the path-switching member 37 and the combined casing 33 can easily be set to such a value that a reducing agent is dispersed and the reducing agent and exhaust gas can appropriately be mixed. The reducing agent injection body 61 is located at a position of the main path 31 between the path-switching member 37 and the combined casing 33. Therefore, even if a problem such as failure is generated in the path-switching member 37, 38, there is no fear that urea water is supplied toward the bypass path 32, and it is possible to eliminate a problem that unused ammonia is discharged outside a ship as it is.

In the first embodiment, the exhaust gas mixer 62 which mixes exhaust gas and a reducing agent is placed in the main path 31 between the path-switching member 37 and the combined casing 33 at a location downstream of the reducing agent injection body 61 in the exhaust gas moving direction. Hence, it is possible to mix exhaust gas and the reducing agent as uniform as possible, a length of the main path 31 between the path-switching member 37 and the combined casing 33 can be made shorter, and the entire exhaust gas path 30 can be made compact. Further, the combined casing 33 can be reduced in size and the installation space can be made small. Hence, it becomes easy to provide the combined casing 33 in the narrow engine room 11 in the ship 1 for example.

The interior of the combined casing 33 is partitioned into the main path 31 and the bypass path 32 by the partition plate 40 which extends along the exhaust gas moving direction. Therefore, it is possible to easily form the two paths 31 and 32 in the combined casing 33 with the simple configuration, i.e., only by adding the partition plate 40. Thus, it is possible to cut down the manufacturing costs of the combined casing 33 which accommodates the selective catalyst reduction device 34, 35.

Since the main path 31 and the bypass path 32 merge with each other in the outlet 42 of the combined casing 33, both exhaust gas which passes through the main path 31 and is purified and exhaust gas which passes through the bypass path 32 can be sent to a downstream side of the exhaust gas path 30 which is connected to the outlet 42 of the combined casing 33. Therefore, the exhaust structure can be simplified and the manufacturing costs can be cut down.

In the case of the conventional ship 1 having a plurality of auxiliary engines (e.g., power-generating engines) which are engines 25, since the ship 1 separately includes the main path 31 and the bypass path 32, twice number of exhaust gas paths 30 as the engines 25 are required, the bypass path 32 must be assembled in a shipbuilding yard, and the number of operation steps is increased. According to the first embodiment, on the other hand, since the main path 31 and the bypass path 32 are handled as one path in the combined casing 33, it is only necessary to prepare the same number of exhaust gas paths 30 as the engines 25. Further, the assembling operation of the bypass path 32 in the shipbuilding yard is unnecessary. The number of operation steps can be reduced and the costs can be cut down.

(5). Exhaust System of Power Generating Device in Second Embodiment

Figure 13:
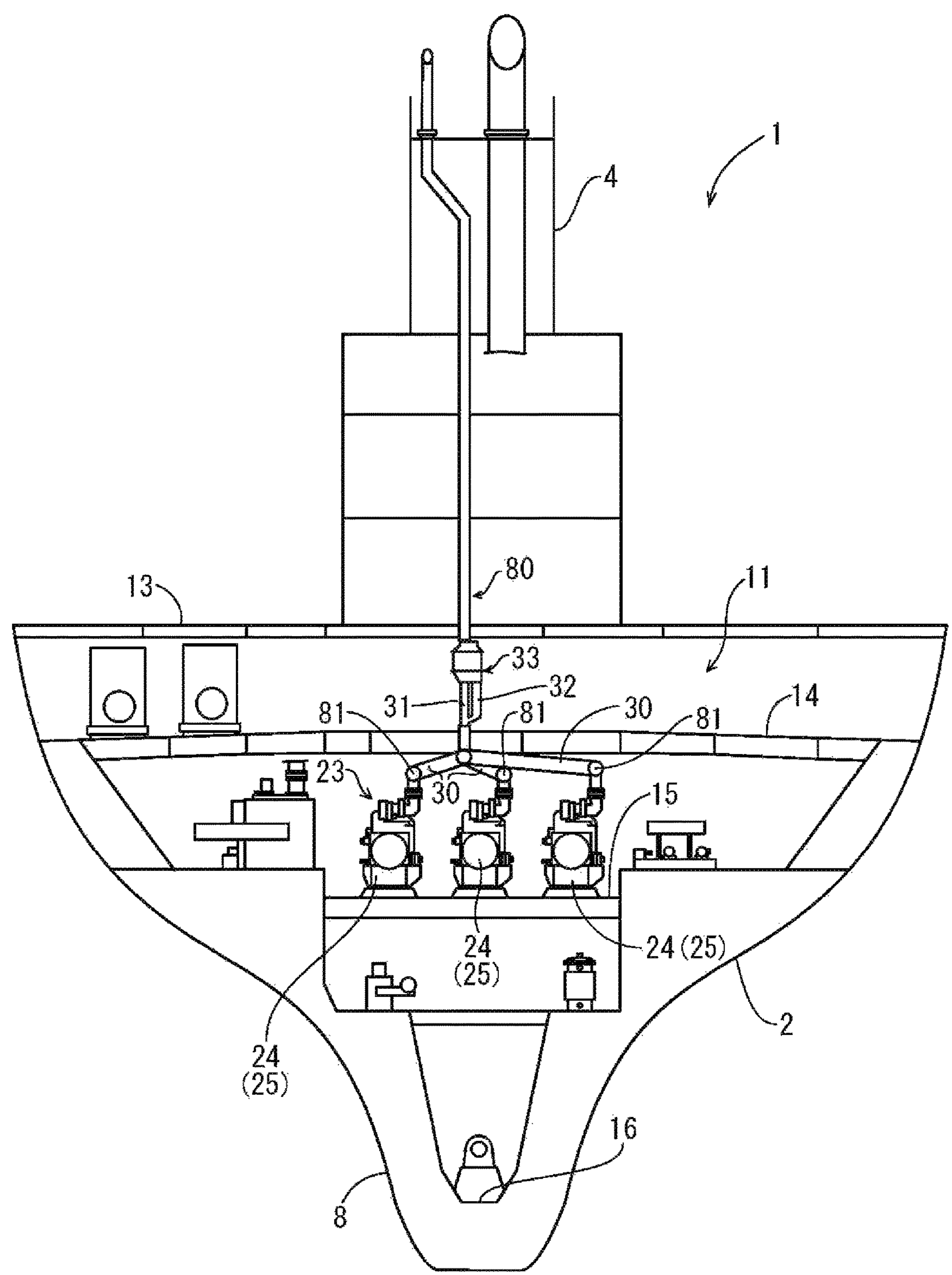
FIG. 13 is a front sectional view of a ship of a second embodiment.

Next, an exhaust system of a power generating device 23 in a second embodiment will be described with reference to FIG. 13. In the second embodiment, exhaust gas paths 30 of power-generating engines 25 merge with each other in a single assembly path 80. Since three power-generating engines 25 exist in the second embodiment, three exhaust gas paths 30 exist. The three exhaust gas paths 30 are gathered in the single assembly path 80. A halfway portion of each of the exhaust gas paths 30 is provided with a check valve 81 which can open only in a direction extending from the power-generating engine 25 toward the assembly path 80. The check valves 81 prevent exhaust gas from flowing backward from the power-generating engines 25. The assembly path 80 extends to a funnel 4 and is in communication directly with outside. The assembly path 80 includes a main path 31 extending to the funnel 4, a bypass path 32 which branches off from a halfway portion of the main path 31, and a combined casing 33 which configures a portion of the main path 31 and a portion of the bypass path 32 and which is in communication with both the main path 31 and the bypass path 32. That is, in the second embodiment, the plurality of power-generating engines 25 are provided, and the main path 31, the bypass path 32 and the combined casing 33 are gathered in a single exhaust gas purification system. Other configurations are substantially the same as those of the first embodiment.

(6). Operation and Effect of Second Embodiment

As described also in the first embodiment, in the case of the conventional ship 1 having a plurality of auxiliary engines (e.g., power-generating engines) which are engines 25, since the ship 1 separately includes the main path 31 and the bypass path 32, twice number of exhaust gas paths as the engines 25 are required, the bypass path 32 must be assembled in a shipbuilding yard, and the number of operation steps is increased. According to the configuration of the second embodiment, on the other hand, the exhaust gas paths 30 are gathered and then, the main path 31 and the bypass path 32 as the assembly path 80 are gathered in the combined casing 33. Therefore, it is possible to extremely simplify the exhaust structure of the ship 1 having the plurality of engines 25. The assembling operation of the bypass paths 32 in the shipbuilding yard is unnecessary, the number of operation steps can be reduced and the costs can be cut down. The entire exhaust gas path 30 can be made compact, the combined casing 33 can be reduced in size and the installation space can be made small. Hence, it becomes easy to provide the combined casing 33 in the narrow engine room 11 in the ship 1 for example.

In the second embodiment also, a reducing agent injection body 61 of a reducing agent supply device which supplies a reducing agent to exhaust gas, and an exhaust gas mixer 62 which mixes exhaust gas and a reducing agent are arranged in this order from upstream in the exhaust gas moving direction, in the main path 31 between the path-switching member 37 and the combined casing 33. Therefore, the reducing agent injection body 61 of the reducing agent supply device and the exhaust gas mixer 62 are located outside the combined casing 33. Hence, a length of the main path 31 between the path-switching member 37 and the combined casing 33 is easily set to such a value that a reducing agent is dispersed and the reducing agent and exhaust gas can appropriately be mixed. Especially, since the reducing agent injection body is located in the main path between the path-switching member and the combined casing, even if a problem such as failure is generated in the path-switching member, there is no fear that urea water is supplied toward the bypass path 32, and it is possible to eliminate a problem that unused ammonia is discharged outside the ship as it is.

In the case of the second embodiment also, the interior of the combined casing 33 is partitioned into the main path 31 and the bypass path 32 by a partition plate 40 which extends along the exhaust gas moving direction, and the main path 31 and the bypass path 32 merge with each other in an outlet 42 of the combined casing 33. Therefore, it is possible to easily form the two paths in the combined casing 33 with the simple configuration, i.e., only by adding the partition plate 40. Thus, it is possible to cut down the manufacturing costs of the combined casing 33 which accommodates the selective catalyst reduction device 34, 35. Further, both exhaust gas which passes through the main path 31 and is purified and exhaust gas which passes through the bypass path 32 can be sent to a downstream side of the assembly path 80 which is connected to the outlet 42 of the combined casing 33. Therefore, the exhaust structure can be simplified and the manufacturing costs can be cut down.

(7). Others

The configurations of the various portions are not limited to those of the illustrated embodiments, and the present invention can variously be changed within scope not departing from the subject matter of the invention. Although the present invention is applied to the exhaust gas purification system which is provided in the exhaust gas path 30 of the power-generating engine 25 in the embodiments, the invention is not limited to this, and the invention may be applied to an exhaust gas purification system in the exhaust system of the main engine 21 for example.

REFERENCE SIGNS LIST

1 Ship
11 Engine room
21 Main engine
22 Speed reducer
23 Power generating device
24 Diesel power generator
25 Power-generating engine
26 Power generator
30 Exhaust gas path
31 Main path
32 Bypass path
33 Combined casing
34 NOx catalyst
35 Slip processing catalyst
37 Main-side switching valve
38 Bypass-side switching valve
40 Partition plate
61 Urea water injection nozzle (reducing agent injection body)
62 Exhaust gas mixer
80 Assembly path
81 Check valve

The invention claimed is:

1. An exhaust gas purification system comprising:

exhaust gas paths of an engine to be mounted in a ship, the exhaust gas paths including:
- a main path which is in communication with an outside, and
- a bypass path which branches off from a portion of the main path, a combined casing with which both the main path and the bypass path are in communication, a partition plate disposed within the combined casing, the partition plate intersects a first surface of the combined casing, intersects a second surface of the combined casing, and extends from a first end of the combined casing in an exhaust gas moving direction, wherein the bypass path within the combined casing is formed as a space defined by the combined casing and the partition plate, a selective catalyst reduction device configured to reduce NOx existing in an exhaust gas of the engine positioned within the combined casing to be operably connected to the main path, a path-switching member configured to switch an exhaust gas moving direction between the main path and the bypass path, the path-switching member placed in a branched portion between the main path and the bypass path, and a reducing agent injection body of a reducing agent supply device configured to supply a reducing agent to the exhaust gas, wherein the reducing agent injection body is placed in the main path between the path-switching member and the combined casing.

2. The exhaust gas purification system according to claim 1, further comprising an exhaust gas mixer configured to mix the exhaust gas and the reducing agent placed in the main path between the path-switching member and the combined casing at a location downstream of the reducing agent injection body in the exhaust gas moving direction.

3. The exhaust gas purification system according to claim 2, wherein the exhaust gas mixer comprises a cylindrical mixer pipe body, a plurality of mixing fins, and a shaft body.

4. The exhaust gas purification system according to claim 1, wherein:

the combined casing further includes an exhaust gas inlet at an upstream side of the combined casing on a side of the main path, the exhaust gas inlet comprises a tapered shape having increasing cross-sectional area as the exhaust gas inlet extends in a direction from the upstream side to a downstream side of the combined casing, and an upstream end of the partition plate intersects the upstream side of the combined casing.

5. The exhaust gas purification system according to claim 1, wherein:

the partition plate extends between a first intersection of the partition plate and a first side of the combined casing and a second intersection of the partition plate and a second side of the combined casing, and the main path and the bypass path merge with each other in an outlet of the combined casing.

6. A ship comprising a plurality of engines and a plurality of exhaust gas purification systems according to claim 1, wherein there is a one-to-one relation between each of the plurality of engines and each of the plurality of exhaust gas purification systems.

7. The exhaust gas purification system according to claim 1, wherein:

the combined casing comprises an upstream side and a downstream side, the exhaust gas moves from the upstream side to the downstream side, the combined casing comprises an exhaust gas inlet at the upstream side of the combined casing on a side of the main path, the exhaust gas inlet comprises a tapered shape having increasing cross-sectional area as the exhaust gas inlet extends in a direction from the upstream side to the downstream side of the combined casing; and the partition plate contacts the upstream side of the combined casing.

8. The exhaust gas purification system according to claim 7, wherein the exhaust gas inlet comprises a conical shape.

9. The exhaust gas purification system according to claim 1, wherein the bypass path branches off from a halfway portion of the main path.

10. The exhaust gas purification system according to claim 1, wherein the combined casing includes an exhaust gas inlet of the main path and an exhaust gas inlet of the bypass path on the same side of the combined casing.

11. The exhaust gas purification system of claim 1, further comprising an exhaust gas inlet of the main path in the combined casing is tapered toward its tip end such that a cross-sectional area of the exhaust gas inlet is reduced toward an upstream side of the combined casing, an upstream end of the partition plate is butted against a front inner surface of the exhaust gas inlet that is located upstream of the selective catalyst reduction device in the combined casing so that the exhaust gas inlet on the side of the main path is not in direct communication with the bypass path and an exhaust gas inlet on the side of the bypass path is not in direct communication with the main path.

12. An exhaust gas purification system in which exhaust gas paths of a plurality of engines to be mounted in a ship merge with a single assembly path, the exhaust gas purification system comprising:

as the assembly path, a main path which is in communication with an outside, and a bypass path which branches off of a portion of the main path, a path-switching member configured to switch exhaust gas moving directions between the main path and the bypass path placed in a branched portion between the main path and the bypass path, a combined casing which encloses a portion of the main path and a portion of the bypass path, wherein an interior of the combined casing is partitioned into the main path and the bypass path by a partition plate that intersects a first surface of the combined casing, intersects a second surface of the combined casing, and extends from a first end toward an outlet of the combined casing along an exhaust gas moving direction, and wherein the bypass path within the combined casing is formed as a space defined by the combined casing and the partition plate, a selective catalyst reduction device configured to reduce NOx existing in exhaust gas of the engine, the selective catalyst reduction device configured in the combined casing to be operably connected to the main path, and a reducing agent injection body of a reducing agent supply device configured to supply reducing agent to the exhaust gas, wherein the reducing agent injection body is placed in the main path between the path-switching member and the combined casing.

13. The exhaust gas purification system according to claim 12, further comprising:

an exhaust gas mixer configured to mix the exhaust gas and the reducing agent, wherein the reducing agent injection body and the exhaust gas mixer are arranged in this order from upstream in the exhaust gas moving direction, in the main path between the path-switching member and the combined casing.

14. The exhaust gas purification system according to claim 13, wherein the exhaust gas mixer comprises a cylindrical mixer pipe body, a plurality of mixing fins, and a shaft body.

15. The exhaust gas purification system according to claim 12, wherein:

the partition plate intersects a first side of the combined casing and intersect a second side of the combined casing that is opposite the first side of the combined casing, and the main path and the bypass path merge with each other in an outlet of the combined casing.

16. The exhaust gas purification system according to claim 12, wherein:

the combined casing comprises an upstream side and a downstream side, the exhaust gas moves from the upstream side to the downstream side, the combined casing comprises an exhaust gas inlet at the upstream side of the combined casing on a side of the main path, the exhaust gas inlet comprises a tapered shape having increasing cross-sectional area as the exhaust gas inlet extends in a direction from the upstream side to the downstream side of the combined casing, and the partition plate contacts the upstream side of the combined casing.

17. The exhaust gas purification system according to claim 16, wherein the exhaust gas inlet comprises a conical shape.

18. The exhaust gas purification system according to claim 12, wherein the bypass path branches off from a halfway portion of the main path.

19. An exhaust gas purification system comprising:

a combined casing comprising:

an outer casing having a first end and a second end, the outer casing defining a cavity;

a main side inflow port; and a bypass side inflow port;

a partition plate comprising a first surface and a second surface opposite the first surface, the partition plate disposed within the cavity and extending from the first end of the outer casing in an exhaust gas moving direction to define:

a main path defined by a first portion of the outer casing and the first surface of the partition plate; and a bypass path defined by a second portion of the outer casing and the second surface of the partition plate; and an outlet coupled to the second end of the outer casing, the outlet in communication with the main path and the bypass path; and wherein:

the partition plate intersects the outer casing at a first surface of the outer casing and at a second surface of the outer casing; and the main path is configured to reduce NOx existing in an exhaust gas flowing through the main path.

20. The exhaust gas purification system according to claim 19, wherein the partition plate further intersects the outer casing at a third surface of the outer casing.

* * * * *